United States Patent
Lisso et al.

(10) Patent No.: US 12,454,414 B2
(45) Date of Patent: Oct. 28, 2025

(54) SYSTEMS AND METHODS FOR HANDLING AND SORTING GARMENT ITEMS FOR STORE REPLENISHMENT

(71) Applicant: Target Brands, Inc., Minneapolis, MN (US)

(72) Inventors: Gregory Lisso, Minneapolis, MN (US); Daniel Seidel, Minneapolis, MN (US); Pablo Lewin, Minneapolis, MN (US); Thomas Gardner, Minneapolis, MN (US); David Sellner, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 599 days.

(21) Appl. No.: 17/968,366

(22) Filed: Oct. 18, 2022

(65) Prior Publication Data

US 2023/0211954 A1 Jul. 6, 2023

Related U.S. Application Data

(60) Provisional application No. 63/295,999, filed on Jan. 3, 2022.

(51) Int. Cl.
| | |
|---|---|
| *B65G 1/137* | (2006.01) |
| *B65D 21/08* | (2006.01) |
| *B65D 85/18* | (2006.01) |
| *B65G 1/04* | (2006.01) |
| *G06Q 10/087* | (2023.01) |

(52) U.S. Cl.
CPC ......... *B65G 1/1378* (2013.01); *B65D 21/086* (2013.01); *B65D 85/185* (2013.01); *B65D 85/187* (2013.01); *B65G 1/0492* (2013.01); *G06Q 10/087* (2013.01); *B65G 2201/0235* (2013.01)

(58) Field of Classification Search
CPC .. B65G 1/1378; B65G 1/0492; B65D 21/086; B65D 85/185; B65D 85/187; G06Q 10/087
See application file for complete search history.

(56) References Cited

U.S. PATENT DOCUMENTS

| | | | |
|---|---|---|---|
| 9,346,619 B1 | 5/2016 | O'Brien et al. | |
| 9,572,426 B1 | 2/2017 | Nauseda et al. | |
| 9,663,293 B2* | 5/2017 | Wurman | B65G 1/137 |
| 10,026,044 B1 | 7/2018 | Wurman et al. | |
| 10,643,179 B1 | 5/2020 | Jain et al. | |
| 2007/0012640 A1* | 1/2007 | Scholen | A47F 5/13 211/195 |

(Continued)

*Primary Examiner* — Kyle O Logan
(74) *Attorney, Agent, or Firm* — Fish & Richardson P.C.

(57) ABSTRACT

Warehouse automation and methods of sorting and sequencing garment items can be used to enhance efficiencies of order fulfillment processes. For example, this document describes warehouse automation of systems and methods for efficiently compiling store replenishment orders for garment items. The systems and methods make store replenishment of garment items highly efficient. In some examples, the systems and methods are focused on automation (e.g., using autonomous mobile robots that transport pods containing garment items) and arranging the garment items in store-ready containers that can be wheeled out directly into the retail area for efficient store replenishment.

18 Claims, 5 Drawing Sheets

(56) References Cited

U.S. PATENT DOCUMENTS

| | | | |
|---|---|---|---|
| 2008/0167884 A1* | 7/2008 | Mountz | G06Q 10/0833 |
| | | | 705/29 |
| 2009/0120887 A1* | 5/2009 | Meehan | B65D 19/385 |
| | | | 211/85.8 |
| 2018/0150793 A1* | 5/2018 | Lert, Jr. | G05B 19/41895 |
| 2019/0177086 A1* | 6/2019 | Mathi | B65G 1/10 |
| 2019/0270591 A1* | 9/2019 | Lert, Jr. | B65G 1/0435 |
| 2020/0062503 A1* | 2/2020 | Lisso | B25J 9/1679 |
| 2020/0156871 A1* | 5/2020 | Fosnight | B65G 1/065 |
| 2020/0167727 A1* | 5/2020 | Ikeda | G06Q 10/087 |
| 2023/0331488 A1* | 10/2023 | Della Torre | G06Q 10/08 |
| 2024/0067451 A1* | 2/2024 | Kanellos | B65G 1/0492 |

* cited by examiner

SYSTEMS AND METHODS FOR HANDLING AND SORTING GARMENT ITEMS FOR STORE REPLENISHMENT

CROSS-REFERENCE TO RELATED APPLICATIONS

This application claims the benefit of U.S. Patent Application Ser. No. 63/295,999, filed on Jan. 3, 2022. The disclosure of the prior application is considered part of (and is incorporated by reference in) the disclosure of this application.

TECHNICAL FIELD

This document relates to systems and methods for enhancing efficiencies of order fulfillment processes. For example, this document relates to warehouse systems and methods for efficiently compiling store replenishment orders for garment items in particular.

BACKGROUND

The order fulfillment process refers to all the steps that companies take from the moment they receive a customer order (which can include an order that is wholly or partly internal to the company, such as a store replenishment order) to the moment that the items are landed in customers' hands. Such steps can include, for example: the order is sent to the warehouse; order sortation (e.g., a worker goes into the warehouse, finds the items in the order, and picks the items from storage); the order is packed for shipping; the order is shipped; and store shelves are replenished.

The use of warehouse automation is one way to increase the efficiency of an order fulfillment process. The goal of warehouse automation is to cut out manual steps of the order fulfillment process, to help reduce the occurrences of human error, and to make processes more efficient. Highly efficient warehousing, order sortation, shipping processes, and store replenishment processes are on the frontline of meeting customer expectations for brick-and-mortar stores that are fully stocked with economically priced goods for customers to purchase.

SUMMARY

This document describes systems and methods for enhancing efficiencies of order fulfillment processes. For example, this document describes warehouse automation of systems and methods for efficiently compiling store replenishment orders for garment items in particular. The systems and methods described herein make store replenishment of garment items highly efficient. In some examples, the systems and methods are focused on automation (e.g., using autonomous mobile robots that transport pods containing garment items) and arranging the garment items in store-ready containers that can be wheeled out directly into the retail area for efficient store replenishment.

In some embodiments, this document describes warehouse automation and methods of automatically sorting and sequencing items to streamline and expedite order fulfillment and store replenishment processes in a cost-effective manner. For example, in some embodiments the systems and methods described herein include: (i) sorting items to a truck-level, (ii) buffering the items until the proper sequence of the items for a first truck (or other type of transport vessel, or other type of sub-set) are available for loading. Then, moving from the buffer all of the items designated for the first truck in a sequence that corresponds to a store aisle or area layout. The items can be loaded manually (or in an automated manner) into particular locations in the first cart in correspondence with the sequence. Then, the loaded first cart can be moved into the first truck (which can be, at least in some embodiments, performed in a particular sequence with other carts for the first truck to make store replenishment efficient).

In one aspect, this disclosure is directed to a system for replenishing a retail store with garment items. The system includes two or more garment item inventory storage pods, each garment item inventory storage pod releasably containing one or more types of garment items; two or more mobile robots configured to autonomously engage with and transport individual garment item inventory storage pods of the one or more garment item inventory storage pods; one or more garment item store-ready transport vessels configured to receive the one or more types of garment items from the one or more garment item inventory storage pods; and a control system. The control system is configured to: (i) control, in response to a first garment item of the one or more types of garment items being on a first order, a first mobile robot of the one or more mobile robots to engage with and transport a first garment item inventory storage pod of the one or more garment item inventory storage pods to an order picking area; and (ii) control, in response to a second garment item of the one or more types of garment items being on the first order, a second mobile robot of the one or more mobile robots to engage with and transport a second garment item inventory storage pod of the one or more garment item inventory storage pods to the order picking area.

Such a system for replenishing a retail store with garment items may optionally include one or more of the following features. The first garment item may be contained in the first garment item inventory storage pod. The second garment item may be contained in the second garment item inventory storage pod. The first garment item inventory storage pod may be configured to contain two or more types of garment items. The two or more types of garment items may include at least two types of garment items selected from the group consisting of: (i) garments on hangars, (ii) garments in bags, (iii) shoes in shoe boxes, (iv) belts, and (v) socks. The one or more garment item store-ready transport vessels may be configured to receive the two or more types of garment items. The one or more garment item store-ready transport vessels may be collapsible to a low-profile configuration when empty of the one or more types of garment items. The one or more garment item store-ready transport vessels may have wheels by which the one or more garment item store-ready transport vessels can be manually rolled on a floor within a retail store. The one or more garment item store-ready transport vessels may include two horizontal bars configured for receiving hangars of garments on hangars. Each one of the one or more garment item store-ready transport vessels may be configured to be stacked on top of another one of the one or more garment item store-ready transport vessels.

In another aspect, this disclosure is directed to a method for replenishing a retail store with garment items. The method includes: (i) autonomously controlling, in response to a first type of garment item being on a first order, a first mobile robot to engage with and transport a first garment item inventory storage pod to an order picking area; and (ii) autonomously controlling, in response to a second type of garment item being on the first order, a second mobile robot to engage with and transport a second garment item inventory storage pod to the order picking area.

Such a method may optionally include one or more of the following features. The first type of garment item may be contained in the first garment item inventory storage pod. The second type of garment item may be contained in the second garment item inventory storage pod. The first garment item inventory storage pod and the second garment item inventory storage pod may be engaged by the first mobile robot and the second mobile robot at an inventory storage area. The method may also include manually transferring to a garment item store-ready transport vessel at the order picking area: (i) one or more of the first type of garment from the first garment item inventory storage pod and (ii) one or more of the second type of garment from the second garment item inventory storage pod. The method may also include transferring the garment item store-ready transport vessel to a truck for transporting the garment item store-ready transport vessel to the retail store. The garment item store-ready transport vessel may be stacked onto another garment item store-ready transport vessel within the truck. The method may also include transferring the garment item store-ready transport vessel to a garment display area of the retail store. The garment item store-ready transport vessel may be rolled on its own wheels to the garment display area of the retail store. The method may also include transferring, from the garment item store-ready transport vessel, the one or more of the first type of garment and the one or more of the second type of garment to respective assigned display areas of the garment display area.

The systems, methods, and processes described herein may be used to provide one or more of the following optional benefits. First, some embodiments provide an order fulfillment process that is more efficient, responsive and agile so that orders can be shipped to internal and external customers in a shorter timeframe than current processes. In particular, the systems, methods, and processes described herein streamline garment item order fulfillment processes by automating item transportation within warehouses and simplifying item-picking processes.

Second, the accuracy of order fulfillment processes can be enhanced by eliminating human errors as a result of using the automated systems, methods, and processes described herein. For example, mobile robotic automation can be implemented to accurately transport garment items that are ordered to designated item picking stations, trucks, or other locations or assets in the warehouse. The items can be inducted from multiple points into particular portions or areas of the order fulfillment processes. This can reduce labor costs and inventory carrying costs associated with the order fulfillment processes.

Third, warehouse space requirements can be reduced by using the automated systems, methods, and processes described herein. Moreover, order fulfillment processes, as described herein, can be accomplished with minimal interruptions to warehouse operations and/or downtime in outbound shipments.

Fourth, the efficiency of store replenishment processes can be enhanced using the systems and methods described herein. For example, in some embodiments store-ready vessels can be loaded with items at the warehouse, then shipped via a truck, and finally transported directly to the retail area of a store. In this manner, the need for multiple manual handling steps of the garment items is minimized, and costs are reduced.

Fifth, the equipment and item storage vessels described herein can be specifically design for storage and transportation of garment items. Accordingly, the equipment and item storage vessels can be particularly efficient and cost effective for garment order fulfillment processes and store replenishment.

Other features, aspects, and potential advantages will be apparent from the accompanying description and figures.

DESCRIPTION OF DRAWINGS

Like reference symbols in the various drawings indicate like elements

DETAILED DESCRIPTION

This document describes systems and methods for enhancing efficiencies of order fulfillment processes. For example, this document describes warehouse automation of systems and methods for efficiently compiling store replenishment orders for garment items in particular. The systems and methods described herein make store replenishment of garment items highly efficient. In some examples, the systems and methods are focused on automation (e.g., using autonomous mobile robots that transport pods containing garment items) and arranging the garment items in store-ready containers that can be wheeled out directly into the retail area for efficient store replenishment.

For example, this document describes the daily replenishment and movement of inventory generated from real-time demand singles for in-store retail sales and/or direct-to-guest on-line sales fulfilled from a multi-echelon inventory-holding model at the correct unit of measure, using fast and efficient material handling equipment that will create operational efficiency at every process step in the supply chain. Said another way, this document describes warehouse automation and methods of controlling material flow to streamline and to consolidate different types of order fulfillment processes (which can include, for example, orders for direct shipments to consumers, orders that are wholly or partly internal to the company such as a store replenishment orders, and/or other like order fulfillment processes).

Figure 1:
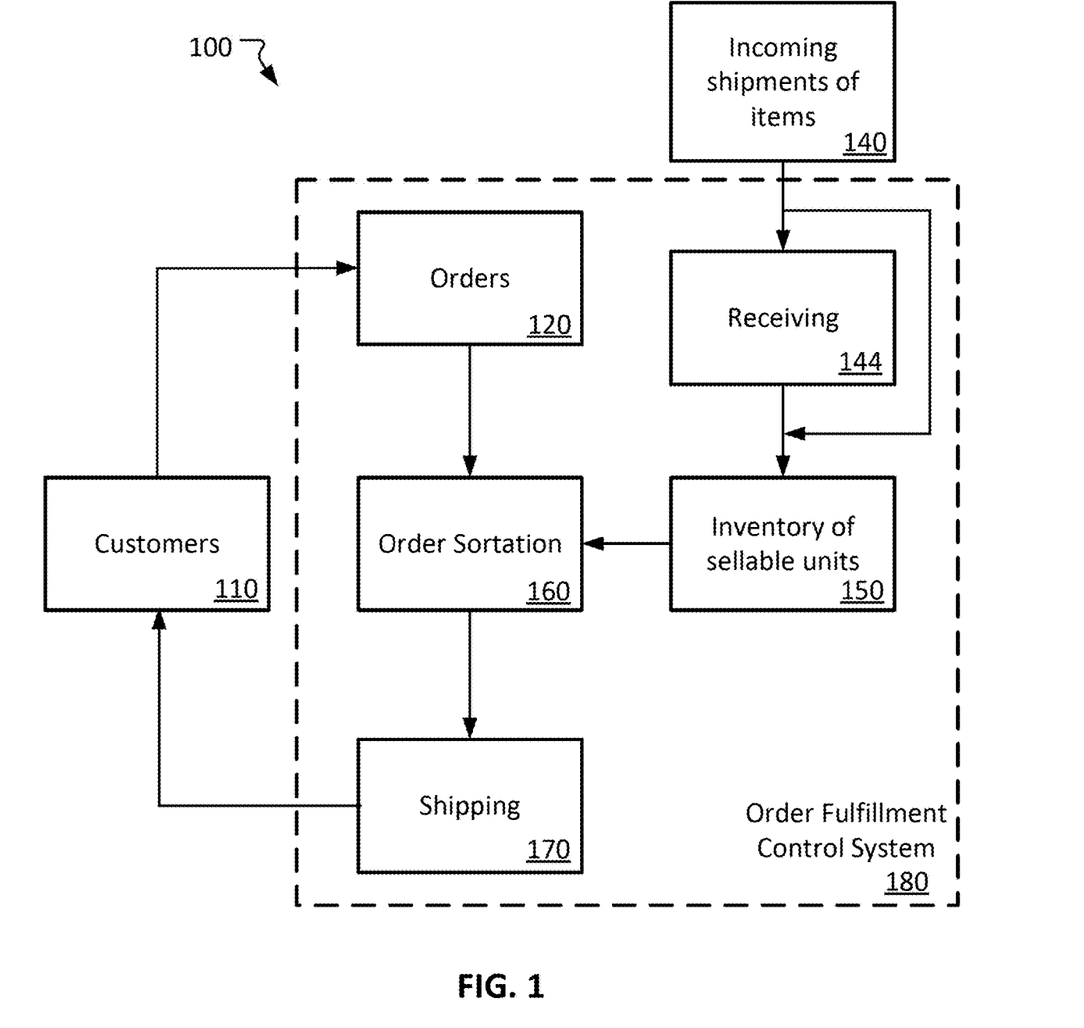
FIG. 1 is a highly-simplified schematic diagram of a basic order fulfillment process.

FIG. 1 depicts an example order fulfillment process 100. The order fulfillment process 100 may take place at a variety of different types of facilities such as, but not limited to, flow centers, distribution centers, warehouses, inventory storing locations, order fulfillment centers, receive centers, stores, cross-docking facilities, material handling facilities, and the like, and combinations thereof. In this disclosure, the term "flow center" (or simply "warehouse") may be used to refer to any and all such different types of facilities, and combinations thereof. In some examples, the order fulfillment process 100 takes place at a single facility. Alternatively, in some examples execution of the order fulfillment process 100 is distributed across two or more facilities. A flow center as described herein can be a portion of a multi-echelon supply chain.

The flow of sellable items within the overall order fulfillment process 100 is driven by demand for those sellable items from customers 110. In this disclosure, the term "customers" will be used to broadly refer to a variety of different entities such as, but not limited to, individual consumers, retail stores (e.g., for stock replenishment), business partners, other flow centers, and the like.

Tangible orders 120 result from the demand for sellable items from the customers 110. An individual order 120 may be for one unit of a single sellable item, for multiple units of a single sellable item, for two or more different types of sellable items, for a case quantity, for a pallet load, and the like, and any and all possible permutations thereof. Whatever the order 120 includes, the goal of the order fulfillment process 100 is to ship (preferably in a single shipment) all of the sellable items included in the orders 120 in a timely and accurate manner. However, the scope of the order fulfillment process 100 also includes partial shipments that do not include all of the items included in an order 120.

The orders 120 are entered into an order fulfillment control system 180 (represented in FIG. 1 by the dashed-line boundary). In some examples, the order fulfillment control system 180 may be part of and/or may comprise a business management system such as, but not limited to, an enterprise resource planning (ERP) system, a materials management system, an inventory management system, a warehouse management system, one or more automation control systems, and the like, and combinations thereof. Accordingly, the order fulfillment control system 180 (or simply "control system 180") can, in some cases, broadly encompass multiple systems that can be situated locally, remotely, or situated both locally and remotely. The control system 180 can include hardware, software, user-interfaces, and so on. For example, the control system 180 may include one or more computer systems, data storage devices, wired and/or wireless networks, control system software (e.g., programs, modules, drivers, etc.), user interfaces, scanners, communication modules, interfaces for control communications with robots, and the like. Such scanners may include hand-held, mobile, and/or fixed readers that can scan, receive, or otherwise detect marks or tags (e.g., bar codes, radio frequency identification (RFID) tags, etc.) on individual sellable items or collections of sellable items (e.g., cases and totes) and communicate with a control station or stations of the control system 180. The scanners may also be able to scan, receive, or otherwise detect the marks or tags (e.g., bar codes, RFID tags, etc.) attached to or integrated with conveyance receptacles such as inventory totes and boxes.

Still referring to FIG. 1, incoming shipments of items 140 arrive at the flow center. In some cases, the incoming shipments of items 140 are processed by receiving 144 (e.g., the performance of inspections, quantity confirmations/reconciliations, inventory/order control system transactions, etc.). Afterwards, the items enter into inventory 150 of the flow center as sellable units. In some cases, some incoming items go directly from receiving 144 into inventory 150 (e.g., if the incoming items were transferred in from an affiliated facility at which the items were already in the inventory system). The types and quantities of the incoming items 140 may be controlled to keep a desired stock level of the sellable units in the inventory 150 of the flow center. In some cases, the types and quantities of the incoming items 140 may be the result of a proactive inventory transfer (e.g., "pushing" inventory), a reactive inventory transfer (e.g., "pulling" inventory), and/or other such inventory management techniques.

The sellable units in inventory 150 can be located in various types of storage accommodations or transport vessels, such as racks, shelves, pods, containers, vessels, carts, bins, totes, pallet lanes, and the like. Such storage accommodations or transport vessels can be individually identified and tracked by the control system 180. That is, the control system 180 can be used to keep track of the quantities in stock of the various sellable items in the inventory 150 and of the inventory location(s) of the various sellable items in the inventory 150. The sellable items in the inventory 150 can be stored in various receptacles such as, but not limited to, boxes, totes, pallets, baskets, bins, bags, and the like.

Next, in the step of order sortation 160, the sellable item(s) included in the customer order 120 are compiled in preparation for shipment to the respective customer 110. To fulfill the customer orders 120, the one or more items specified in each order may be retrieved, or picked, from inventory 150. Picked sellable items may be delivered or conveyed to one or more areas in the flow center for sorting and assembling into one or more outbound shipping containers for the fulfillment of a respective customer order 120. Outbound shipping containers containing the ordered sellable items are then transported to customers 110 at the step of shipping 170.

FIG. 1 and the foregoing description of the order fulfillment process 100 has provided a high-level overview of the operations of a flow center. Next, in the following figures, additional details of particular order sortation systems and methods, and store replenishment systems and processes will be described. In particular, the order sortation systems and methods, and store replenishment of garment items are described hereafter.

Figure 2:
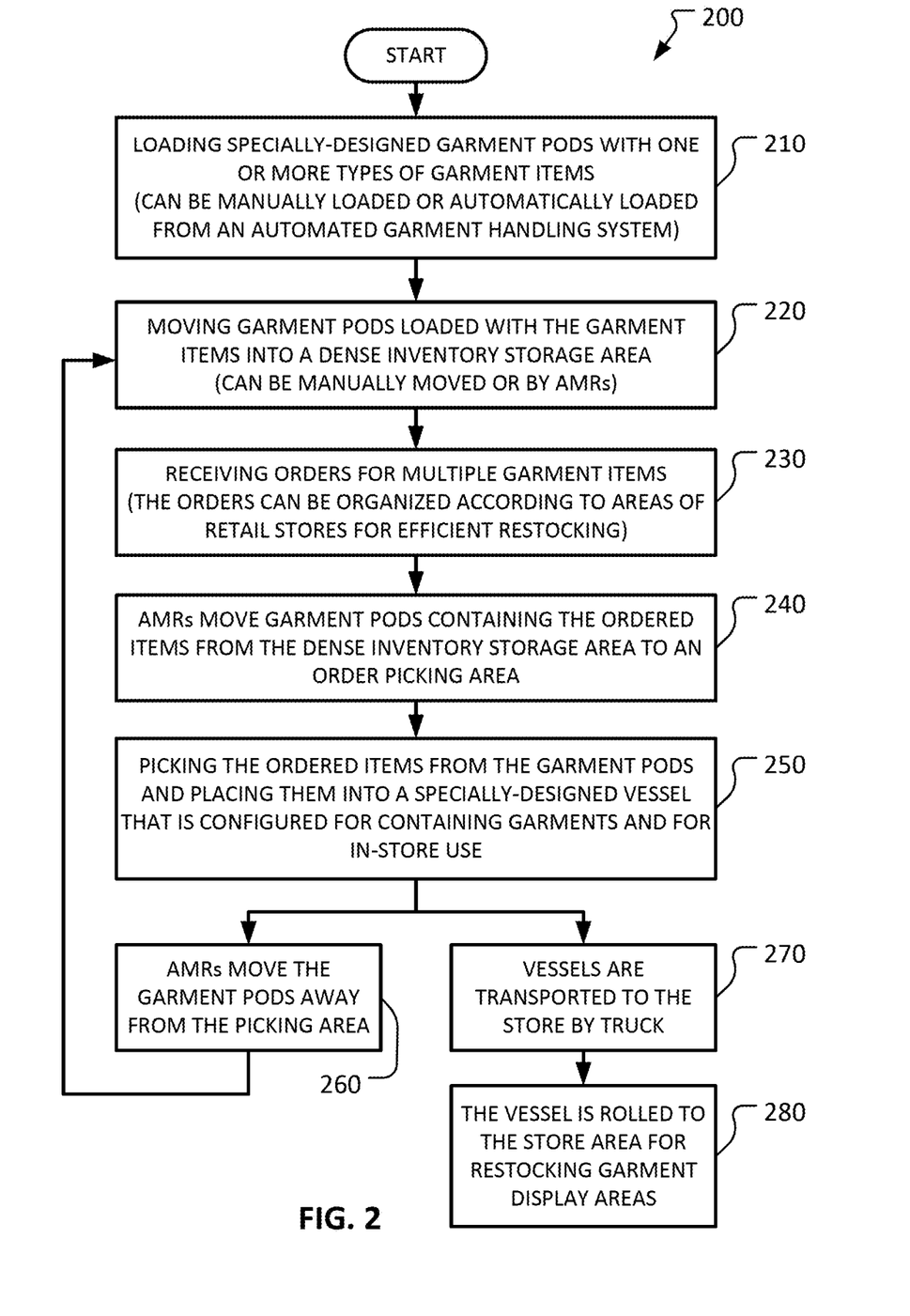
FIG. 2 is a flowchart of an example garment item order fulfillment process and store replenishment process in accordance with some embodiments.

FIG. 2 depicts an example garment item order fulfillment and store replenishment process 200 (or more simply "process 200") in accordance with some embodiments. While not specifically depicted in FIG. 2, it should be understood that the process 200 includes or involves the use of one or more order fulfillment control systems (such as the order fulfillment control system 180 of FIG. 1, a warehouse management system, one or more computerized automation/robotic control systems, and/or other such systems that can communicate and coordinate control activities between each other and across the overall process 200). Such an order fulfillment control system can be situated locally, remotely situated, or both locally situated and remotely.

As described further below, the process 200 comprises warehouse automation and methods of sorting and sequencing garment items to enhance efficiencies of order fulfillment processes. For example, the process 200 uses warehouse automation systems (e.g., autonomous mobile robots that transport pods containing garment items) and methods for efficiently compiling store replenishment orders for garment items. The systems and methods of the process 200 make store replenishment of garment items highly efficient. In some examples, the systems and methods of the process 200 include arranging the garment items in store-ready containers that can be wheeled out directly into the retail area for efficient store replenishment.

Figure 3:
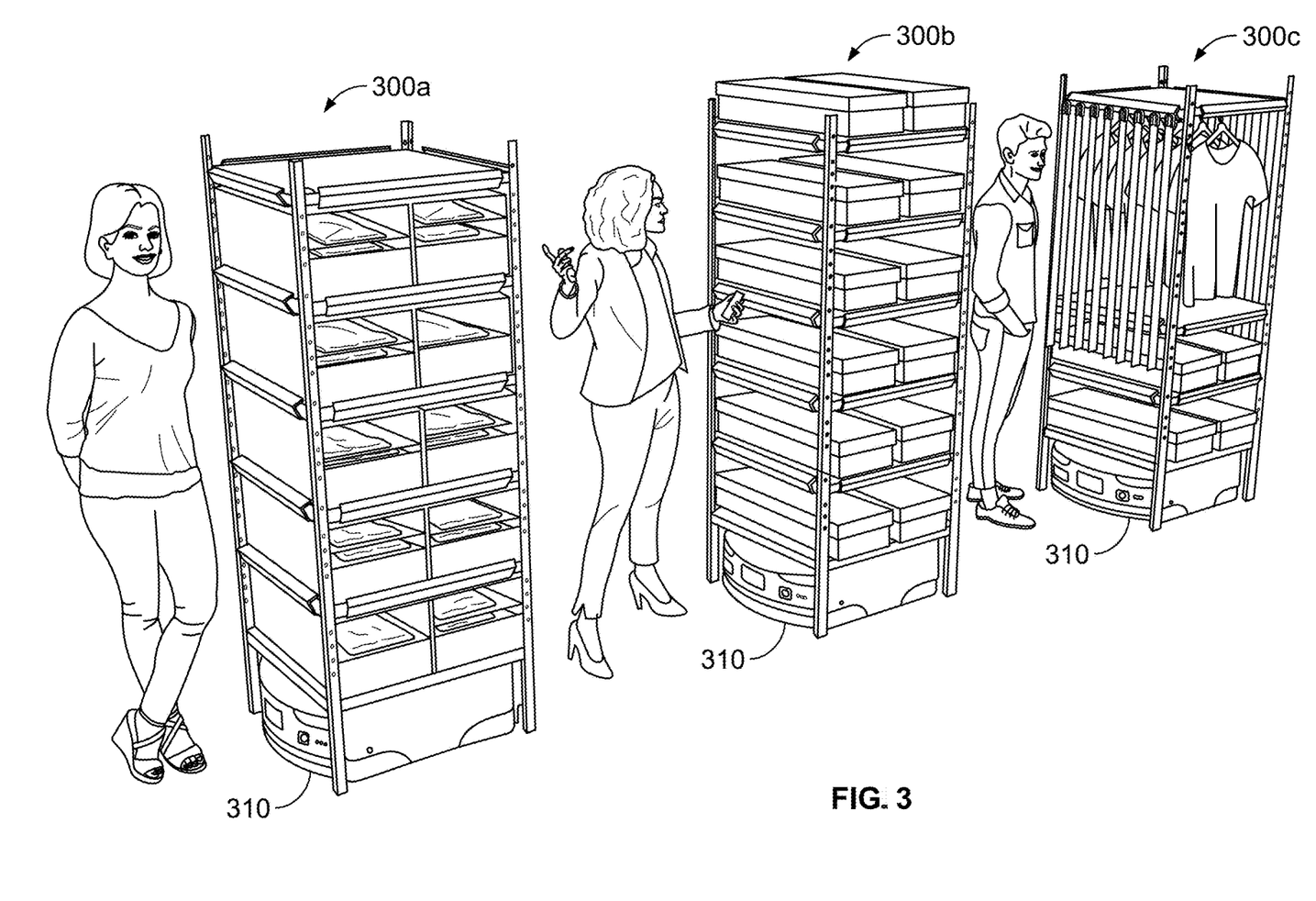
FIG. 3 are perspective views of example garment item inventory storage pods in accordance with some embodiments.

In step 210, garment item inventory storage pods are loaded with one or more types of garment items. FIG. 3 depicts three different example types of garment item inventory storage pods 300a, 300b, and 300c that can be used in step 210. The garment item inventory storage pods 300a-c are used to releasably contain and store garment items at a facility such as a flow center or warehouse in wait for sorting the garment items to fulfill customer orders, such as store replenishment orders. Hereafter, the garment item inventory storage pods 300a, 300b, and 300c can be referred to in a generic sense as a garment item inventory storage pod 300.

The garment item inventory storage pods 300a-c can each releasably contain one or more different types of garment items. For example, the garment item inventory storage pod 300a is depicted as containing various garment items in poly bags. The poly bags, in turn, are held in cardboard bin drawers on shelves of the garment item inventory storage pod 300a, which help to keep the poly bags from falling out.

The garment item inventory storage pod 300b is depicted as containing multiple shoe boxes. The shoe boxes are on shelves of the garment item inventory storage pod 300b.

The garment item inventory storage pod 300c is depicted as containing multiple shoe boxes, multiple hanging garments, and multiple belts. This illustrates that an individual garment item inventory storage pod 300 can be used to store, or releasably contain, multiple different types of garment items (such as, but not limited to, garments on hangers, garments in bags, shoes in shoe boxes, belts, socks, ties, scarfs, undergarments, accessories, and any other types of garment items).

In some embodiments, the garment item inventory storage pods 300 are modular and/or user-configurable. That is, the garment item inventory storage pods 300 can be selectively configured by a user to receive and store one or more of any type of garment items. In some embodiments, the garment item inventory storage pods 300 can include one or more soft-sides (e.g., such as made of canvas or other flexible sheet materials).

In the depicted embodiments, the garment item inventory storage pods 300 are configured to be engaged by, and transported by, an autonomous mobile robot 310 (or "AMR 310"). That is, an AMR 310 can move into position beneath a garment item inventory storage pod 300, then raise the garment item inventory storage pod 300 up from resting on the floor, and then transport the garment item inventory storage pod 300 around the warehouse. The AMRs 310 can be wirelessly controlled by one or more control systems, such as a fleet management system and/or the like. Accordingly, the AMRs 310 can autonomously move around the garment item inventory storage pods 300 so as to facilitate the execution of the process 200 and the like.

The garment items stored in/on the individual garment item inventory storage pods 300 are traceable. That is, each of the garment item inventory storage pods 300 can have a unique identifier, and the individual types of garment items also have unique identifiers. In some embodiments, such unique identifiers are automatically readable and comprise scan-able barcodes, scan-able QR codes, RFID tags, and/or the like. Accordingly, in some examples the warehouse inventory control system (e.g., the order fulfillment control system 180 of FIG. 1) in combination with inventory transactions made by workers using automated scanning devices can be used to trace the specific garment item contents of each of the individual garment item inventory storage pods 300.

For example, in step 210 workers can load garment items onto an individual garment item inventory storage pods 300. As that is happening, the worker can scan the unique identifier of the individual garment item inventory storage pod 300 and scan the unique identifier of each of the garment items loaded onto the individual garment item inventory storage pod 300. In this manner, inventory transactions can be made semi-automatically so that the inventory contents of each of the individual garment item inventory storage pods 300 is known by the warehouse inventory control system (e.g., the order fulfillment control system 180 of FIG. 1).

In some embodiments, step 210 comprises the loading of garment items onto individual garment item inventory storage pods 300 automatically. For example, in some embodiments the garment item inventory storage pods 300 are configured to interface with an automated rail apparel sorting system (not shown). Such an arrangement can be particularly suitable for garments on hangers, and/or garment items in hanging pouches/bags. In such a case, garment items can be automatically transferred between the automated rail apparel sorting system and the garment item inventory storage pods 300, precluding the need for manual loading of at least some kinds of garment items.

Still referring to FIG. 2, in step 220 the garment item inventory storage pods 300 that are carrying one or more different types of garment items are temporarily moved into an inventory storage area. Such an inventory storage area can be, for example, an area that is accessible by mobile robots, and in which multiple garment item inventory storage pods 300 are statically stored in a dense arrangement. In some embodiments, the garment item inventory storage pods 300 are moved into the inventory storage area by the AMRs 310 (see FIG. 3). Alternatively, in some embodiments the garment item inventory storage pods 300 are moved into the inventory storage area by workers using pallet jacks, forklift trucks, and the like, or simply by pushing or pulling the garment item inventory storage pods 300 (when wheels are included on the garment item inventory storage pods 300).

After the garment item inventory storage pods 300 are moved into the inventory storage area, the individual garment item inventory storage pods 300 can remain there in the inventory storage area until one or more of the garment items stored on the individual garment item inventory storage pods 300 are required for fulfillment of a customer order.

In step 230, one or more orders are received for multiple garment items. The one or more orders can be received by one or more order fulfillment control systems (such as the order fulfillment control system 180 of FIG. 1, a warehouse management system, a fleet management system, one or more computerized automation/robotic control systems, and/or other such systems that can communicate and coordinate control activities between each other and across the overall process 200), hereinafter referred to as the control system 180.

In some embodiments, the orders are organized according to areas of a retail store that has ordered garment items for inventory replenishment. Such organization of the orders can be beneficial when the areas of the store are actually stocked (as described further below). For example, orders can be organized into groupings such as, but not limited to, retail store areas for women's shirts, men's pants, shoes, children's clothes, etc.

In step 240, the ARMs 310 are controlled by the control system 180 to autonomously move to the inventory storage area and to engage with the particular garment item inventory storage pods 300 that contain the garment items that comprise the one or more orders that were received in step 230. This can involve one or more of the ARMs 310, and, correspondingly, one or more of the garment item inventory storage pods 300. For example, a single order can require one ARM 310 and one garment item inventory storage pod 300, two ARMs 310 and two garment item inventory storage pods 300, three ARMs 310 and three garment item inventory storage pods 300, four ARMs 310 and four garment item inventory storage pods 300, and so on, without limitation.

After the ARMs 310 are engaged with the required garment item inventory storage pods 300 (containing the order garment items), the ARMs 310 autonomously transport the garment item inventory storage pods 300 to an order picking area.

In step 250, at the order picking area, the ordered garment items are picked from the garment item inventory storage pods 300 that were transported by the ARMs 310 in step 240 to the order picking area. The picked garment items are then placed in dedicated, specially-designed store-ready garment transport vessels/containers.

Figure 4:
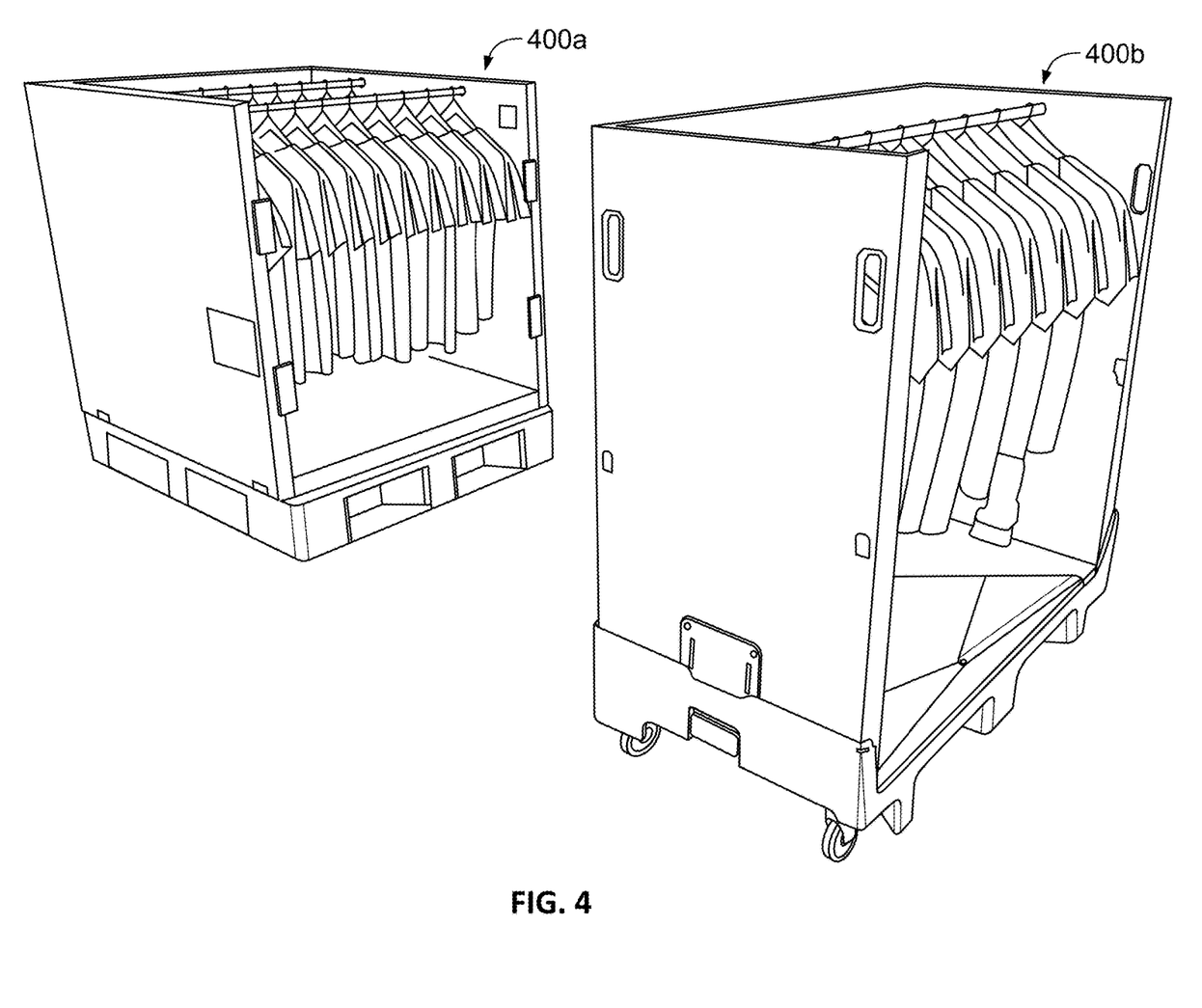
FIG. 4 are perspective views of example garment item store-ready transport vessels in accordance with some embodiments.
Figure 5:
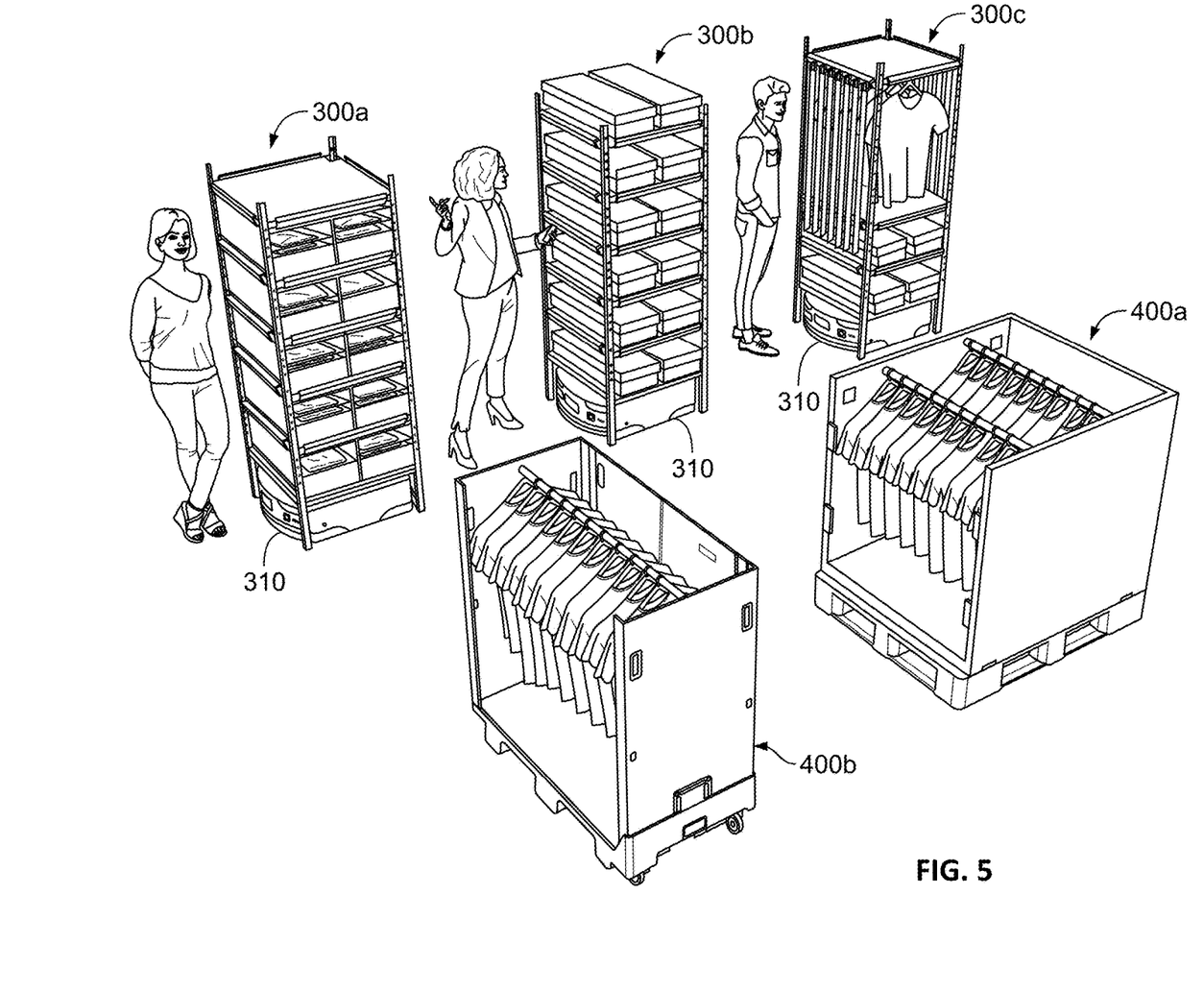
FIG. 5 is an illustration of an example garment item order sorting process that utilizes the garment item inventory storage pods of FIG. 2 in conjunction with the garment item store-ready transport vessels of FIG. 4.

FIGS. 4 and 5 depict two example store-ready garment transport vessels 400a and 400b into which the picked garment items can be placed. The store-ready garment transport vessel 400a includes two horizontal bars configured for receiving hangars of garments on hangars. The store-ready garment transport vessel 400b includes a single horizontal bar configured for receiving hangars of garments on hangars. Hereafter, the example store-ready garment transport vessels 400a and 400b can be referred to in a generic sense as a store-ready garment transport vessel 400.

While not shown, the store-ready garment transport vessels 400 include four sidewalls and a top. The walls and top of the store-ready garment transport vessels 400 can snap together, or be held together by clamps or other types of fasteners/joinery.

Other configurations of store-ready garment transport vessels 400 are also envisioned and within the scope of this disclosure. For example, in some embodiments the store-ready garment transport vessels 400 are specially configured for receiving other types of garment items including, but not limited to, garments in bags, shoes in shoe boxes, belts, ties, scarfs, socks, other clothing items and accessories, and combinations thereof, without limitation. Accordingly, the specially configured store-ready garment transport vessels 400 can include any number and/or combination of shelves, hooks, bars, pockets, bins, and the like, so as to configure the store-ready garment transport vessels 400 for storing the various types of garment items.

In some embodiments, the store-ready garment transport vessels 400 have wheels (e.g., see the store-ready garment transport vessel 400b). The wheels can make the store-ready garment transport vessels 400 convenient for transporting. For example, the wheels can make the store-ready garment transport vessels 400 convenient for transporting within a store, including out directly into a retail area where the garment items contained in the store-ready garment transport vessels 400 can be put on display for purchase. Hence, the store-ready garment transport vessels 400 are "store-ready."

In some embodiments, the store-ready garment transport vessels 400 are collapsible when empty of garment items. That is, in some embodiments the walls and/or other structures of the store-ready garment transport vessels 400 are reconfigurable into a relatively flat, or low-profile state. This feature increases the storage density of empty store-ready garment transport vessels 400, and can reduce the costs of shipping and handling the empty store-ready garment transport vessels 400.

Still referring to FIG. 2, after the completion of step 250 in which the ordered garment items are placed into the store-ready garment transport vessels 400, in step 260 the AMRs 310 autonomously transport the garment item inventory storage pods 300 back to the inventory storage area. In some cases, the inventory of garment items in the garment item inventory storage pods 300 may be replenished (as in step 210) prior to being returned to the inventory storage area. The AMRs 310 can thereafter disengage from the garment item inventory storage pods 300.

In step 270, the store-ready garment transport vessels 400 are loaded into a transport vessel such as a truck or trailer for shipping to another location such as, but not limited to, a retail store.

In some embodiments, the store-ready garment transport vessels 400 are configured to be stackable on top of each other. This can be the case even for the store-ready garment transport vessels 400 that include wheels. The stack-ability of the store-ready garment transport vessels 400 can be particularly beneficial during shipping of the store-ready garment transport vessels 400 containing garment items. In such a case, two or more of the stackable store-ready garment transport vessels 400 can be vertically arranged in a transport vessel, such as a truck or trailer.

In some examples, the store-ready garment transport vessels 400 can be arranged in the transport vessel in a sequence that will enhance the efficiency of the store replenishment process. For example, store-ready garment transport vessels 400 stored in certain areas in the transport vessel can be designated for transport to certain areas of the store.

In step 280, the store-ready garment transport vessels 400 containing garment items can be rolled out to the store display area for convenient and efficient restocking of the garment display areas. As described above, certain store-ready garment transport vessels 400 can contain only garment items that are displayed in a particular confined area of the store. As one example, in some cases men's and women's clothing items will not be mixed in an individual store-ready garment transport vessel 400. That, again, can make the restocking of the garment display areas convenient and efficient by minimizing the need for moving the store-ready garment transport vessels 400 around the store.

To provide for interaction with a user, some aspects of the systems and techniques described here can be implemented on one or more mobile computing devices having display devices (e.g., a CRT (cathode ray tube) or LCD (liquid crystal display) monitor) for displaying information to the user, a keyboard, and/or a pointing device (e.g., a mouse, a trackball, or a touchscreen, etc.) by which the user can provide input to the computing device. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, tactile input, eye movement tracking input, a brain-computer interface, gesture input, and the like, and combinations thereof).

Some aspects of the systems and techniques described here can be fully or partially implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

In some embodiments, the computing system can include clients and servers. A client and server are generally remote from each other and typically interact through a communication network. The relationship of client and server arises by virtue of computer programs running on the respective computers and having a client-server relationship to each other.

While this specification contains many specific embodiment details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Particular embodiments of the subject matter have been described. Other embodiments are within the scope of the following claims. For example, the actions recited in the claims can be performed in a different order and still achieve desirable results. While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described herein should not be understood as requiring such separation in all embodiments, and it should be understood that the described program components and systems can generally be integrated together in a single product or packaged into multiple products.

What is claimed is:

1. A system for replenishing a retail store with garment items, the system comprising:
    two or more garment item inventory storage pods, each garment item inventory storage pod releasably containing one or more types of garment items;
    two or more mobile robots configured to autonomously engage with and transport individual garment item inventory storage pods of the one or more garment item inventory storage pods;
    one or more garment item store-ready transport vessels configured to receive the one or more types of garment items from the one or more garment item inventory storage pods, wherein each of the one or more garment item store-ready transport vessels:
        has wheels by which the one or more garment item store-ready transport vessels can be manually rolled on a floor within a retail store;
        is collapsible to a low-profile configuration when empty of the one or more types of garment items; and
        is configured to be stacked on top of another one of the one or more garment item store-ready transport vessels when collapsed in the low-profile configuration; and
    a control system configured to:
        control, in response to a first garment item of the one or more types of garment items being on a first order, a first mobile robot of the two or more mobile robots to engage with and transport a first garment item inventory storage pod of the two or more garment item inventory storage pods to an order picking area; and
        control, in response to a second garment item of the one or more types of garment items being on the first order, a second mobile robot of the two or more mobile robots to engage with and transport a second garment item inventory storage pod of the two or more garment item inventory storage pods to the order picking area.

2. The system of claim 1, wherein the first garment item is contained in the first garment item inventory storage pod.

3. The system of claim 2, wherein the second garment item is contained in the second garment item inventory storage pod.

4. The system of claim 1, wherein the first garment item inventory storage pod is configured to contain two or more types of garment items.

5. The system of claim 4, wherein the two or more types of garment items include at least two types of garment items selected from the group consisting of: (i) garments on hangars, (ii) garments in bags, (iii) shoes in shoe boxes, (iv) belts, and (v) socks.

6. The system of claim 5, wherein the one or more garment item store-ready transport vessels are configured to receive the two or more types of garment items.

7. The system of claim 1, wherein the one or more garment item store-ready transport vessels comprise two horizontal bars configured for receiving hangars of garments on hangars.

8. The system of claim 1, wherein the one or more garment item store-ready transport vessels comprise four side walls and a top.

9. A method for replenishing a retail store with garment items, the method comprising:
    autonomously controlling, in response to a first type of garment item being on a first order, a first mobile robot to engage with and transport a first garment item inventory storage pod to an order picking area; and
    autonomously controlling, in response to a second type of garment item being on the first order, a second mobile robot to engage with and transport a second garment item inventory storage pod to the order picking area; and
    transferring to a garment item store-ready transport vessel at the order picking area: (i) one or more of the first type of garment from the first garment item inventory storage pod and (ii) one or more of the second type of garment from the second garment item inventory storage pod,
    wherein the garment item store-ready transport vessel:
        has wheels by which the one or more garment item store-ready transport vessels can be manually rolled on a floor within a retail store;
        is collapsible to a low-profile configuration when empty of the one or more types of garment items; and
        is configured to be stacked on top of another one of the one or more garment item store-ready transport vessels when collapsed in the low-profile configuration.

10. The method of claim 9, wherein the first type of garment item is contained in the first garment item inventory storage pod.

11. The method of claim 10, wherein the second type of garment item is contained in the second garment item inventory storage pod.

12. The method of claim 9, wherein the first garment item inventory storage pod and the second garment item inventory storage pod are engaged by the first mobile robot and the second mobile robot at an inventory storage area.

13. The method of claim 9, further comprising transferring the garment item store-ready transport vessel to a truck for transporting the garment item store-ready transport vessel to the retail store.

14. The method of claim 13, wherein the garment item store-ready transport vessel is stacked onto another garment item store-ready transport vessel within the truck.

15. The method of claim 13, further comprising transferring the garment item store-ready transport vessel to a garment display area of the retail store.

16. The method of claim 15, wherein the garment item store-ready transport vessel is rolled on its own wheels to the garment display area of the retail store.

17. The method of claim 15, further comprising transferring, from the garment item store-ready transport vessel, the one or more of the first type of garment and the one or more of the second type of garment to respective assigned display areas of the garment display area.

18. The method of claim 9, wherein the garment item store-ready transport vessel comprises four side walls and a top.

\* \* \* \* \*